United States Patent [19]
Yamanaka

[11] 3,835,761
[45] Sept. 17, 1974

[54] SKEWERING MACHINE

[76] Inventor: Takeharu Yamanaka, No. 1-26, 3 Chome Inchinotani-cho, Suma-Ku, Kobe City, Japan

[22] Filed: June 18, 1973

[21] Appl. No.: 370,843

[52] U.S. Cl........ 99/421 H, 99/443 C, 100/DIG. 10
[51] Int. Cl. .......................................... A47j 37/04
[58] Field of Search.......... 99/421 H, 349, 419–420, 99/426–427, 430, 443 C, 448; 100/153–154, DIG. 10, DIG. 13; 17/1 S; 249/90; 294/87 SH

[56] References Cited
UNITED STATES PATENTS

| | | | |
|---|---|---|---|
| 3,019,722 | 2/1962 | Gum | 100/DIG. 10 |
| 3,135,614 | 6/1964 | Parisi et al. | 99/421 H X |
| 3,579,713 | 5/1971 | Kang et al. | 99/419 X |
| 3,602,237 | 8/1971 | Jureit et al. | 100/DIG. 13 |

*Primary Examiner*—Harvey C. Hornsby
*Assistant Examiner*—Arthur O. Henderson
*Attorney, Agent, or Firm*—McGlew and Tuttle

[57] ABSTRACT

A machine for skewering pieces of materials, particularly foods such as meat, onions, etc., comprises a first conveyor having a series of supporting plates for receiving the material and each including guide means for guiding a skewer for movement thereacross. The plates are advanced one at a time into association with a presser which presses the material downwardly on the plate and holds the material in position while skewer rods are fed from a second conveyor into alignment with the guide means on the plates and then pushed through the material which is being pressed on the plates. The skewers are fed in succession from a hopper supply onto the second conveyor where the skewers are arranged in spaced relationship and fed by the second conveyor into association with a slide mechanism which pushes each skewer transversely through a guide of a guide plate carrying the material to be skewered and which is located at a presser station. The conveyors and the skewer supply system and the presser are all driven in timed relationship by a single drive motor.

5 Claims, 2 Drawing Figures

SKEWERING MACHINE

BACKGROUND OF THE INVENTION

1. FIELD OF THE INVENTION

This invention relates in general to devices for interconnecting articles on a common skewer or rod and, in particular, to a new and useful device for skewering pieces of material particularly food such as meat, onions, etc.

2. DESCRIPTION OF THE PRIOR ART

At the present time there is a very large demand in restaurants for foods which are skewered and the preparation and assembling of the food on a skewer is time-consuming and very difficult. At the present time, such skewering work is done by hand and it is very difficult for an operator to skewer large quantities of such food without sometimes injuring his hands in the operation when in many instances the hand skewered materials are not well centered on the skewer so that they become detached. The operation by hand is inefficient and it is also unfavorable from a sanitary viewpoint.

SUMMARY OF THE INVENTION

In accordance with the invention, there is provided a machine for automatically centering and pressing materials which are intended to be skewered on a skewer plate of a first conveyor, while a skewer rod is pushed through the materials held in compression by an automatic pusher. With the inventive arrangement, the materials such as meat, onions, etc., may be placed on an individual supporting plate of a conveyor which is advantageously provided with a shoulder at one end with a guide for the skewer. The materials may be easily aligned with the guide in a position such that the skewer, when passing through the guide, will enter centrally of the material. The apparatus of the invention also includes means for directing individual skewers or rods from a bin or supply thereof onto a second conveyor in spaced orientation where they are moved in succession to a position at which they are aligned with the guide means of the plates of the first conveyor. Associated with the second conveyor is a mechanism for pushing each skewer at the aligned position with the pressure station so that the skewer moves through the guide of the plates carrying the material and pierces the material to skewer all of the material compressed on the plates by the presser member. The two conveyors and the supply system for the skewers, as well as the presser, are all driven in timed relationship by a single driving motor.

Accordingly, it is an object of the invention to provide an improved machine for skewering pieces of mateials, particularly foods, such as meats, onions, etc., which includes means for pressing the materials to be skewered at a pressing station and for pushing a skewer rod through the material as it is held.

A further object of the invention is to provide an automatically operable machine which includes means for loading materials to be skewered on individual plates which are advanced to a presser station and for moving the presser to hold the individual plates in succession while skewers are separately fed through a conveyor to a position at which they become aligned with guide means on the plates and for automatically displacing the skewers from the second conveyor to cause them to pierce the materials compressed by the plates on the first conveyor.

A further object of the invention is to provide a machine for skewering which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
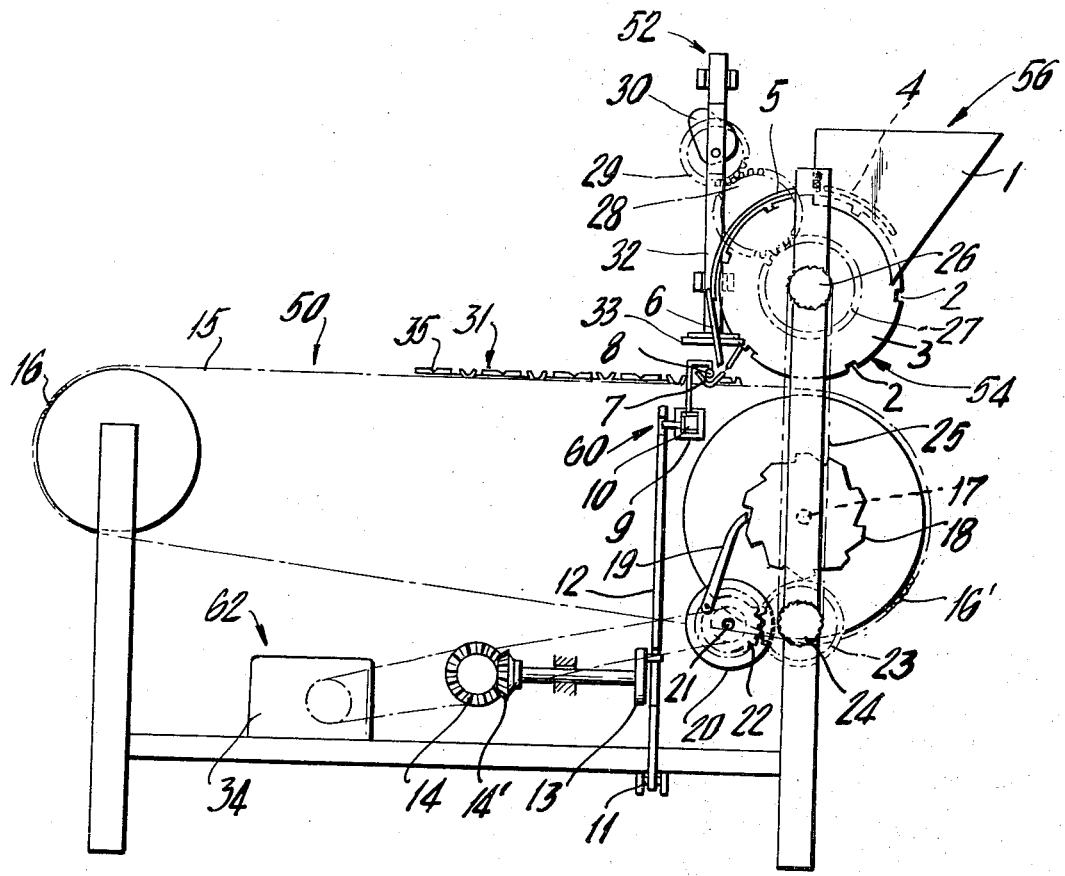
FIG. 1 is a partly schematic side elevational view of a skewering machine constructed in accordance with the invention.
Figure 2:
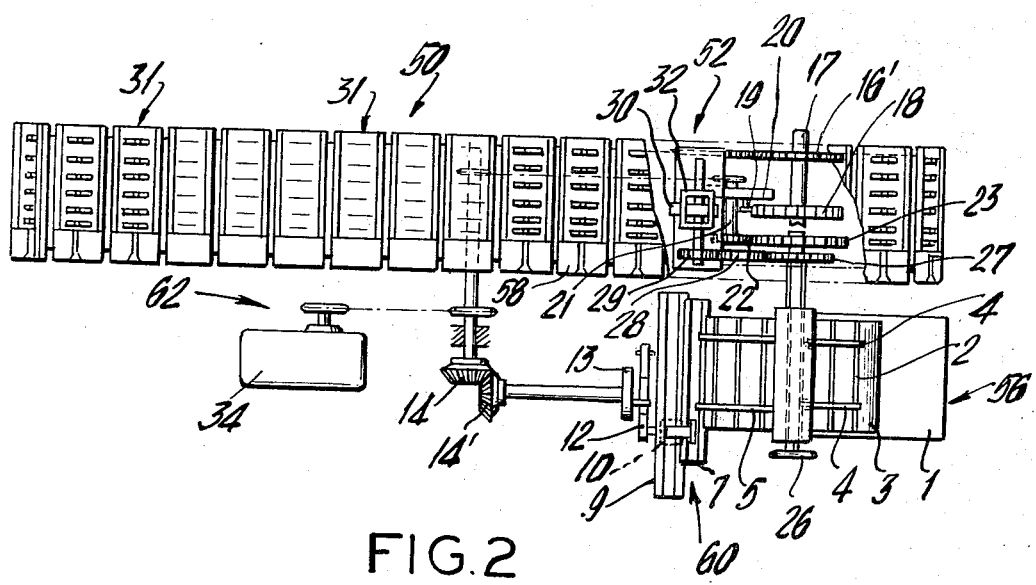
FIG. 2 is a top plan view partly broken away of the device shown in FIG. 1

Referring to the drawings in particular, the invention embodied therein, comprises a skewering device which includes a first conveyor, generally designated 50, which has a plurality of individual skewer material support plates or loader plates, generally designated 31, which are adapted to be loaded with materials for skewering, particularly foods, such as meats, onions, etc., and they are moved into association with presser means, generally designated 52 which is located at a presser station in order that the materials thereon may be held in a stationary position while they are being skewered. The apparatus includes a second conveyor, generally designated 54, as shown in FIG. 2, which is supplied with individual skewers from a skewer supply, generally designated 56. The second conveyor 54 advances the skewers in succession to a position in which they are aligned with guide means or a guide groove 58 which is defined at the end of each individual plate 31 when the individual plate 31 is aligned in the presser station 52. Pusher means, generally designated 60 are provided for pushing a pusher rod transversely through the guide groove 58 and into the materials which are pressed at the presser station 52.

The skewer supply 52 includes a supply hopper 1 having an arcuately opened bottom end which is blocked by a rotatable supply drum 3. The supply drum 3 is provided with a plurality of circumferentially spaced grooves 2 of a size to permit engagement of a single skewer thereon which then moves upwardly and is held in parallel relationship by the rotation of the drum 3. An inlet guide arm 4 extends across the bottom open space of the hopper above the drum 3 and provides a guide for guiding individual rods into the associated grooves 2 and for ensuring that only one of them leaves the hopper in a groove at each time. An outlet side guide arm 5 is also provided which extends exteriorly of the bin 1 downwardly to the lower end of the drum 3. In addition a guide gutter 6 is disposed on the lower end of the outlet side of guide arm 5 and located in a direction such that, as the supply drum 3 rotates, the rods are guided downwardly into a groove defined on a receiving angle 7 which is indexed past the supply discharge.

In the embodiment shown, the second conveyor 54 comprises the rotatable drum 3 which is movable to advance each skewer or rod to a position in which it is deposited on the angle member 7 which has a groove which is already aligned with the presser station 52. In accordance with a feature of the invention, skewer pusher means 60 include a fixed member 9 defining a slideway in which a slider 10 is movable backwardly and forwardly. The slider 10 carries a skewer pushing rod 8 which engages behind each skewer and moves it transversely where it is centered by the guide means on the end of the individual plates 31 so as to advance centrally across the plates and skewer each piece of material which is placed on the plates and held in compression thereon by the presser means 52. The pusher means 60 includes a swinging rod 12 which pivots about a hinge 11 on one side of the slider 10. Slider 10 is engaged with the rod 12 in a manner such that it may be slid backwardly and forwardly upon swinging movement of the rod 12.

Drive means, generally designated 62, for operating the various elements in timed sequence includes a drive motor 34 which drives through bevel gearing 14 and 14' and a crank 13 which is connected to the swinging rod 12 and causes oscillation of the swinging rod during rotation of the crank. The first conveyor 50 includes an endless chain 15 which extends over sprocket wheels 16 and 16' and which is positioned so that its upper reach extends substantially horizontally through a path intersecting the presser station 52. A shaft 17 of the sprocket wheel 16' is provided with a ratchet 18 which is engaged by a pawl 19. The pawl 19 is eccentrically carried on a rotating plate 20 by a pivotal connection thereto. A gear 22 is also affixed on the shaft of the rotating plate 20 and engages with a gear 23. A sprocket wheel 24 is carried on the same shaft as the gear 23, and it rotates a sprocket 26 through a chain 25. Motion is then transmitted from the sprocket wheel 26 to an eccentric cam 30 through gears 27, 28 and 29. The eccentric cam 30 slides and engages with a vertically reciprocating sliding shaft 32 at the presser station 52. A presser plate 33 is secured to the sliding shaft 32 and it moves upwardly and downwardly therewith and is adapted to engage the materials carried on the meat loader cases 31. The guide means 58 at one side of the individual plates 31 includes a split groove 35 through which each skewer is advanced during the actual skewering of the materials which are pressed downwardly on the plates 31 by the presser plate 33.

Operation of the device is as follows.

Skewers are thrown into the supply box 1 and the materials to be skewered are loaded on a plurality of the plates 31 and each plate is advanced or indexed in succession into association with the presser station 52. The skewers, at the same time, are moved from the supply bin 1 into the grooves 2 and deposited one at a time into the receiving channel 7 the groove which is aligned with the groove 35 of the guide means on the plates 31.

The drive means 62 causes an indexing movement of the plates 31 past the presser station 52. The rotating plate 20 moves the pawl 19 up and down and the ratchet 18 is thereby intermittently rotated and the sprocket wheel 16' rotates intermittently thus moving the endless chain 15 and the plates 31 carried thereby by one indexing movement at a time equal to the distance between the centers to adjacent plates. When the material loaded plates 31 stop in a position coinciding with the center line of the guide groove of the receiving member 7, the shaft 21 of the rotating plate 20 drives the sprocket wheel 24 and the gears 22 and 23 to drive the sprocket wheel 26 and the sprocket wheel 24 and the endless chain 25 to cause a rotation of the eccentric cam 30 and the lowering of the shaft 32 with the presser plate 33 to effect the pressing of the material on the plate which is located at the pressing station 52.

The crank 13 which is revolved by the gears 14 then inclines the swinging rod 12 toward the loaded plates at the presser station 52 and the slider 10 causes the pusher 8 to push a skewer rod through the materials thereon.

Thus, in accordance with the invention, it is possible merely by arranging cut meat and onions and the like along the receiving plates 31 to pierce a plurality of such articles automatically each time a plate is moved into association with the presser mechanism 52. The skewering is accomplished automatically and without the materials having to be held by an operator.

While a specific embodiment of the invention has been shown and described in detail to illustrate the application of the principles of the invention, it will be understood that the invention may be embodied otherwise without departing from such principles.

What is claimed is:

1. A machine for skewering pieces of materials, particularly foods such as meat, onions, etc., comprising a presser station having a movable presser for pressing the materials to be skewered, a first conveyor having a series of material supporting plates with skewer guide means, said plates being movable through a path intersecting said presser station for presenting the material on each plate in alignment with said presser, a second conveyor alongside said first conveyor for advancing skewers successively into alignment with each plate which is moved to said presser station, skewer pusher means engageable with each skewer in succession which is moved into alignment with said skewer guide means of said plates to move a skewer from said second conveyor through said guide means and the material on said plate of said first conveyor, and drive means for moving said first and second conveyors and said presser in timed relationship.

2. A machine for skewering pieces of materials, according to claim 1, wherein said second conveyor comprises a supply bin for skewers having an opening at its lower end, a rotatable drum movable through the opening of said bin having a plurality of grooves extending across said drum in parallel relationship and being spaced circumferentially therearound of a size to engage a single skewer from said bin and move it with said drum and discharge guide means associated with said drum for directing each skewer which is moved thereby into a position in which it is aligned transversely with said guide means of a plate positioned at said presser station.

3. A machine for skewering pieces of materials, according to claim 1, wherein said skewer pusher means includes slideway guide means extending transversely of said first conveyor, a slide movable in said guide means carrying a pusher engageable with a skewer and an oscillatable rod member connected to said slide and being driven by said drive means to move said slide to advance said pusher.

4. A machine for skewering pieces of materials, according to claim 2, wherein said skewer pusher means includes slideway guide means extending transversely of said first conveyor, a slide movable in said guide means carrying a pusher engageable with a skewer and an oscillatable rod member connected to said slide and being driven by said drive means to move said slide to advance said pusher.

5. A machine for skewering pieces of materials, according to claim 1, wherein said first conveyor comprises an endless conveyor with said material supporting plates being arranged therealong, said plates having said guide means on one side comprising a raised portion having a centering groove for the passage of a skewer therethrough.

* * * * *